United States Patent
Yokouchi et al.

(10) Patent No.: US 8,909,401 B2
(45) Date of Patent: Dec. 9, 2014

(54) VEHICLE CONTROL DEVICE AND VEHICLE CONTROL METHOD

(75) Inventors: Yoshimitsu Yokouchi, Okazaki (JP); Tetsuo Hori, Toyota (JP); Hideto Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 82 days.

(21) Appl. No.: 13/700,589

(22) PCT Filed: Jun. 8, 2010

(86) PCT No.: PCT/JP2010/059665
§ 371 (c)(1),
(2), (4) Date: Nov. 28, 2012

(87) PCT Pub. No.: WO2011/155024
PCT Pub. Date: Dec. 15, 2011

(65) Prior Publication Data
US 2013/0073134 A1  Mar. 21, 2013

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 17/00 | (2006.01) |
| G06F 7/00 | (2006.01) |
| B60W 20/00 | (2006.01) |
| B60K 6/365 | (2007.10) |
| B60W 10/08 | (2006.01) |
| B60W 30/20 | (2006.01) |
| B60K 6/445 | (2007.10) |

(52) U.S. Cl.
CPC ............... *B60W 20/00* (2013.01); *B60K 6/365* (2013.01); *B60W 10/08* (2013.01); *B60W 30/20* (2013.01); *B60W 20/1084* (2013.01); *B60K 6/445* (2013.01); *B60W 2710/083* (2013.01); *Y10S 903/902* (2013.01); *Y02T 10/6239* (2013.01)

USPC ................... 701/22; 701/51; 701/52; 701/58; 180/65.285; 903/902

(58) Field of Classification Search
CPC ..... B06W 20/00; B06W 20/10; B06W 10/06; B06W 2030/1809; B06W 10/184; Y10S 903/905; Y10S 3/945; Y10S 903/93; Y10S 903/902; Y02T 10/7022; Y02T 10/7044; Y02T 10/26; Y02T 10/48
USPC ............... 701/54, 22, 31, 70, 102, 67, 58, 68; 180/65.2, 65.23, 65.275, 446, 65.21; 318/811; 903/902, 930, 903, 946, 906, 903/911, 945

See application file for complete search history.

(56) References Cited

U.S. PATENT DOCUMENTS

| | | | | |
|---|---|---|---|---|
| 2004/0045524 | A1* | 3/2004 | Matischuk et al. | ........... 123/350 |
| 2004/0163860 | A1* | 8/2004 | Matsuzaki et al. | ........... 180/65.2 |

(Continued)

FOREIGN PATENT DOCUMENTS

| | | |
|---|---|---|
| JP | 2005 204360 | 7/2005 |
| JP | 2006 262585 | 9/2006 |

(Continued)

OTHER PUBLICATIONS

International Search Report Issued Jul. 20, 2010 in PCT/JP10/59665 Filed Jun. 8, 2010.

*Primary Examiner* — Calvin Cheung
*Assistant Examiner* — Luis A Martinez Borrero
(74) *Attorney, Agent, or Firm* — Oblon, Spivak, McClelland, Maier & Neustadt, L.L.P.

(57) ABSTRACT

HV-ECU executes a program including a step of executing rattling noise avoidance control when an engine operating point falls within a rattling noise producing range and when a requested torque Treq2 falls within the rattling noise producing range, and a step of executing normal control when the engine operating point does not fall within the rattling noise producing range or when the requested torque Treq2 does not fall within the rattling noise producing range.

6 Claims, 9 Drawing Sheets

(56) References Cited

U.S. PATENT DOCUMENTS

| | | | |
|---|---|---|---|
| 2005/0102082 A1* | 5/2005 | Joe et al. | 701/54 |
| 2005/0211479 A1* | 9/2005 | Tamor | 180/65.2 |
| 2006/0138995 A1* | 6/2006 | Sugita et al. | 318/811 |
| 2008/0071437 A1* | 3/2008 | Hirata et al. | 701/22 |
| 2008/0109125 A1* | 5/2008 | Hahn | 701/22 |
| 2008/0220934 A1* | 9/2008 | Babcock et al. | 477/5 |
| 2008/0280726 A1* | 11/2008 | Holmes et al. | 477/5 |
| 2009/0131215 A1* | 5/2009 | Shamoto | 477/3 |
| 2009/0133945 A1* | 5/2009 | Falkenstein et al. | 180/65.265 |
| 2009/0211826 A1* | 8/2009 | Hashimoto | 180/65.275 |
| 2010/0004806 A1* | 1/2010 | Soma | 701/22 |
| 2010/0042276 A1* | 2/2010 | Seel et al. | 701/22 |
| 2010/0114424 A1* | 5/2010 | Morris et al. | 701/31 |
| 2011/0130901 A1* | 6/2011 | Mori et al. | 701/22 |
| 2011/0130904 A1* | 6/2011 | McGrogan et al. | 701/22 |

FOREIGN PATENT DOCUMENTS

| | | |
|---|---|---|
| JP | 2006 316967 | 11/2006 |
| JP | 2007 302121 | 11/2007 |
| JP | 2009101823 A | 5/2009 |
| JP | 2009257232 A | 11/2009 |

\* cited by examiner

VEHICLE CONTROL DEVICE AND VEHICLE CONTROL METHOD

TECHNICAL FIELD

The present invention relates to controlling a vehicle equipped with an internal combustion engine and a rotating electric machine for generating driving force for a wheel, and particularly to controlling the rotating electric machine to prevent occurrence of continuous rattling noise in a plurality of gears that couple the internal combustion engine and the rotating electric machine.

BACKGROUND ART

In recent years, as one of measures against environmental issues, a hybrid vehicle that travels by driving force from an internal combustion engine and an electric motor for driving, and the like are receiving attention. In such a hybrid vehicle, abnormal noise, such as rattling noise of gears provided in a transmission including the electric motor for driving, may occur depending on the running condition of the vehicle.

In view of such a problem, Japanese Patent Laying-Open No. 2006-262585 (PTL 1) discloses a hybrid vehicle that prevents abnormal noise from occurring in a gear mechanism such as a change gear connected to an electric motor. This hybrid vehicle includes an internal combustion engine, electric power/motive power input/output means connected to an output shaft of the internal combustion engine and a drive shaft coupled to an axle shaft and capable of outputting at least a portion of motive power from the internal combustion engine to the drive shaft with electric power and motive power being input/output, an electric motor capable of inputting/outputting motive power to/from the axle shaft via the gear mechanism, power storage means exchanging electric power with the electric power/motive power input/output means and the electric motor, requested driving force setting means setting requested driving force requested of the axle shaft, target operating point setting means setting a target operating point of the internal combustion engine based on the requested driving force as set using predetermined restrictions, and control means that executes normal control when execution of normal control of controlling the internal combustion engine, the electric power/motive power input/output means and the electric motor such that the internal combustion engine is operated at the target operating point as set and such that the driving force based on the requested driving force as set is output to the axle shaft will cause the driving force output from the electric motor to fall outside a predetermined driving force range including zero, and executes abnormal control of controlling the internal combustion engine, the electric power/motive power input/output means and the electric motor such that the driving force output from the electric motor falls outside the predetermined driving force range and such that the driving force based on the requested driving force as set is output to the axle shaft, when execution of normal control will cause the driving force output from the electric motor to fall within the predetermined driving force range.

The hybrid vehicle disclosed in the above-identified publication can prevent abnormal noise from occurring in the gear mechanism that may occur based on the driving force output from the electric motor falling within the predetermined driving force range including zero.

CITATION LIST

Patent Literature

PTL 1: Japanese Patent Laying-Open No. 2006-262585

SUMMARY OF INVENTION

Technical Problem

However, in order to prevent abnormal noise from occurring in the gear mechanism when the driving force output from the electric motor falls within the predetermined driving force range as in the hybrid vehicle disclosed in the above-identified publication, the engine is operated at an operating point out of an optimal fuel efficiency operation line, which degrades fuel efficiency. Moreover, when the driving force output from the electric motor falling within the predetermined driving force range falls outside the predetermined driving force range, the engine is operated upon return to an operating point on the optimal fuel efficiency operation line, so that the driving force output from the electric motor may vary significantly, which may cause a gap in power balance and rattling noise to occur.

The present invention was made to solve the above-described problems, and has an object to provide a vehicle control device and a vehicle control method which prevent occurrence of abnormal noise.

Solution to Problem

A vehicle control device according to an aspect of the present invention is a vehicle control device mounted on a vehicle including an internal combustion engine, a first rotating electric machine for generating electric power using motive power of the internal combustion engine, a second rotating electric machine transmitting driving force to a wheel, and a plurality of gears coupling the internal combustion engine, the first rotating electric machine and the second rotating electric machine. This vehicle control device includes a calculation unit for calculating a requested torque requested of the second rotating electric machine based on driving power requested of the vehicle, and a control unit for, when a first execution condition including a condition that the requested torque enters a first range is met, maintaining a torque command value for the second rotating electric machine within a second range included in the first range. The second range is a range including the case where the torque command value attains zero.

Preferably, when the first execution condition is met, the control unit changes the torque command value such that the torque command value falls within the second range before the requested torque does, and then maintains the torque command value within the second range.

Still preferably, when a second execution condition that an absolute value of a difference between the requested torque and the torque command value is smaller than or equal to a predetermined value is met after the torque command value is changed so as to fall within the second range, the control unit changes the torque command value so as to exceed the first range before the requested torque does.

Still preferably, when the first execution condition is met, the control unit changes the torque command value such that the torque command value attains zero before the requested torque does, and then maintains the torque command value at zero.

Still preferably, when the first execution condition is met, the control unit determines the torque command value such that an absolute value of an amount of change in the torque command value is larger than the absolute value of an amount of change in the requested torque.

Still preferably, when the first execution condition is met, the control unit changes the torque command value such that a locus of changes in the torque command value represents a curve projecting in a direction of changing the torque command value, and when the second execution condition is met, the control unit changes the torque command value such that a locus of changes in the torque command value represents a curve projecting in a direction opposite to the direction of changing the torque command value.

A vehicle control method for a vehicle according to another aspect of the present invention is a vehicle control method for a vehicle including an internal combustion engine, a first rotating electric machine for generating electric power using motive power of the internal combustion engine, a second rotating electric machine transmitting driving force to a wheel, and a plurality of gears coupling the internal combustion engine, the first rotating electric machine and the second rotating electric machine. The vehicle control method for a vehicle includes the steps of calculating a requested torque requested of the second rotating electric machine based on driving power requested of the vehicle, and when a first execution condition including a condition that the requested torque enters a first range is met, maintaining a torque command value for the second rotating electric machine within a second range included in the first range. The second range is a range including the case where the torque command value attains zero.

Advantageous Effects of Invention

According to the present invention, by maintaining a torque command value Tm within a rattling noise OK range including the case where it attains zero, a deviation between torque command value Tm and a requested torque requested of a second MG can be reduced while causing the torque command value to pass through a rattling noise NG range more rapidly than in the case where torque command value Tm is not maintained within the rattling noise OK range. This can prevent occurrence of rattling noise that would be caused by repeated collision of teeth sections, and can prevent torque command value Tm from changing significantly. Therefore, an output torque of second MG can be prevented from varying significantly. As a result, variations in electric power (rotation speed×torque) can be reduced, and a gap in power balance that would be caused by variations in electric power can be reduced. Therefore, a vehicle control device and a vehicle control method which prevent occurrence of abnormal noise can be provided.

DESCRIPTION OF EMBODIMENTS

Figure 1:
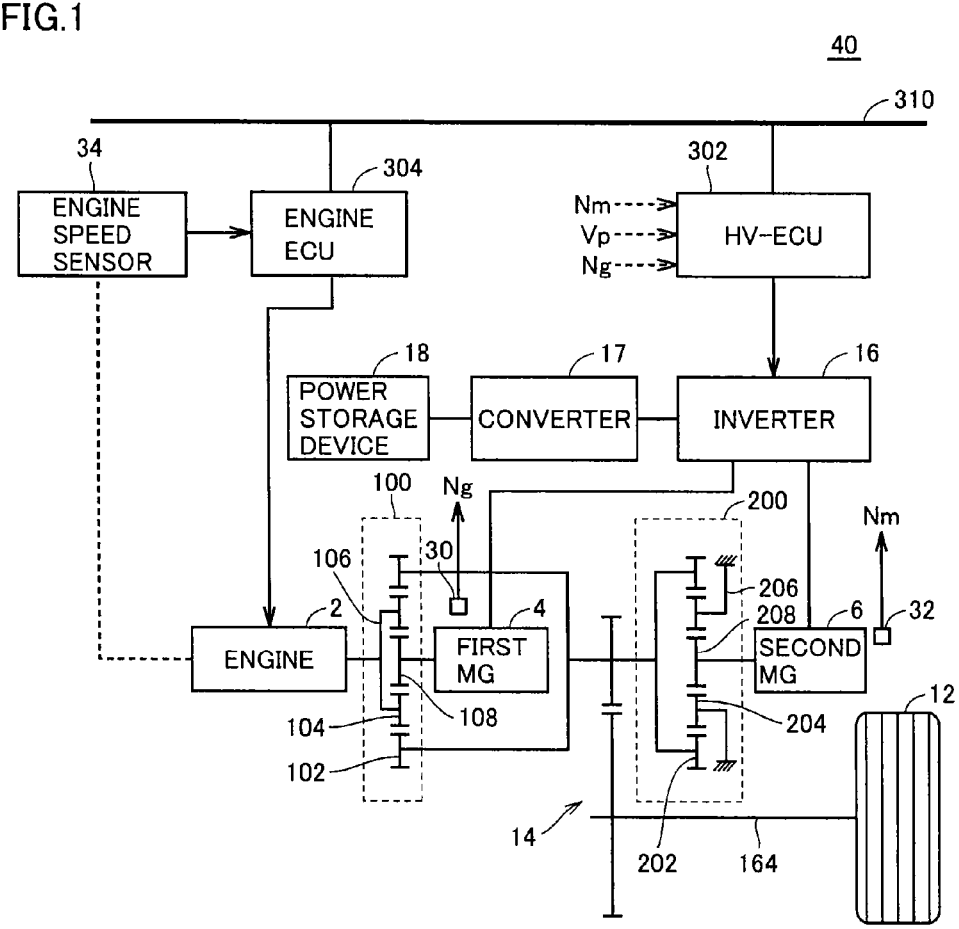
FIG. 1 is a (first) diagram showing an overall configuration of a hybrid vehicle in the present embodiment.

Hereinafter, an embodiment of the present invention will be described with reference to the drawings. In the following description, the same parts have the same reference characters allotted. They are named and function identically. Therefore, detailed description thereof will not be repeated.

As shown in FIG. 1, a vehicle 40 includes an engine 2, a first motor generator (hereinafter referred to as MG) 4 for power generation and startup, a second motor generator (hereinafter referred to as second MG) 6 for driving, a driving wheel 12, an inverter 16, a converter 17, a power storage device 18, a first rotation speed sensor 30, a second rotation speed sensor 32, an engine speed sensor 34, a power split device 100, a reduction planetary gear 200, an HV-ECU (Electronic Control Unit) 302, and an engine ECU 304.

In the present embodiment, vehicle 40 is a hybrid vehicle at least equipped with engine 2 and second MG 6 for driving, each of engine 2 and second MG 6 for driving being directly coupled to driving wheel 12 via power split device 100 and reduction planetary gear 200.

Engine 2 is an internal combustion engine, such as a gasoline engine and a diesel engine, combusting fuel to output motive power, and is configured to allow a throttle angle (an amount of intake air), an amount of fuel supplied, a timing of ignition, and other operation states to be electrically controlled. It is controlled for example by engine ECU 304 having a microcomputer serving as a main component.

Each of first MG 4 and second MG 6 is a three-phase AC rotating electric machine, and has a function as an electric motor (motor) and a function as a power generator (generator).

First rotation speed sensor 30 and second rotation speed sensor 32 are connected to HV-ECU 302. First rotation speed sensor 30 detects a rotation speed Ng of first MG 4. First rotation speed sensor 30 transmits a signal indicating detected rotation speed Ng of first MG 4 to HV-ECU 302. Second rotation speed sensor 32 detects a rotation speed Nm of second MG 6. Second rotation speed sensor 32 transmits a signal indicating detected rotation speed Nm of second MG 6 to HV-ECU 302.

Each of first MG 4 and second MG 6 is connected to power storage device 18 such as a battery or a capacitor, via inverter 16 and converter 17. HV-ECU 302 controls inverter 16 to thereby control an output torque Ta of first MG 4 at the time of start up of engine 2 and power generation with engine 2 serving as the power source. HV-ECU 302 also controls inverter 16 to thereby control an output torque Tb of second MG 6 at the time of running or regenerative braking of vehicle 40.

Specifically, HV-ECU 302 calculates requested power Preq requested of vehicle 40 based on rotation speed Ng of first MG 4, rotation speed Nm of second MG 6, an amount by which an accelerator pedal (not shown) is depressed, a vehicular speed, and the like. HV-ECU 320 generates a torque command value Tg for first MG 4, a torque command value Tm for second MG 6, and requested power Pe requested of engine 2 based on calculated requested power Preq.

HV-ECU 302 calculates requested torques Treq1 and Treq2 requested of first MG 4 and second MG 6, respectively, based on requested power Preq, and generates torque command values Tg and Tm based on calculated requested torques Treq1 and Treq2, respectively.

HV-ECU 302 controls inverter 16 such that generated torque command values Tg and Tm are achieved, thereby controlling each of output torque Ta and output torque Tb. Moreover, HV-ECU 302 transmits generated requested power Pe to engine ECU 304.

Further, HV-ECU 302 controls converter 17 to thereby boost a DC voltage of power storage device 18 for supply to inverter 16, and to lower a DC voltage from inverter 16 for supply to power storage device 18.

Power split device 100 is a planetary gear provided between engine 2 and first MG 4. Power split device 100, for example, splits the motive power received from engine 2 into motive power to first MG 4 and motive power to a reduction gear 14 coupled to driving wheel 12 with a drive shaft 164 interposed therebetween.

Power split device 100 includes a first ring gear 102, a first pinion gear 104, a first carrier 106, and a first sun gear 108. First sun gear 108 is an externally toothed gear coupled to the output shaft of first MG 4. The first ring gear is an internally toothed gear arranged concentrically with respect to first sun gear 108, and is coupled to reduction gear 14. First pinion gear 104 meshes with each of first ring gear 102 and first sun gear 108. First carrier 106 holds first pinion gear 104 rotatably and revolvably, and is coupled to the output shaft of engine 2.

That is, first carrier 106 is an input element, first sun gear 108 is a reaction element, and first ring gear 102 is an output element.

While engine 2 is operated, when a reaction torque provided by first MG 4 is input to first sun gear 108 with respect to a torque output from engine 2 and input to first carrier 106, a torque of a magnitude obtained by adding/subtracting these torques appears at first ring gear 102 serving as the output element. In that case, first MG 4 has its rotor rotated by that torque, and first MG 4 functions as a power generator. Further, if first ring gear 102 has a fixed rotation speed (output rotation speed), increasing/decreasing the rotation speed of first MG allows the speed of engine 2 to change continuously (or steplessly). More specifically, control to set the speed of engine 2 at for example a rotation speed that will achieve the best fuel efficiency can be done by controlling first MG 4. It is controlled by HV-ECU 302.

When engine 2 is stopped while vehicle 40 is running, first MG 4 rotates in the reverse direction, and if in that condition first MG 4 is controlled to function as an electric motor and to output a torque in the direction of forward rotation, a torque having a direction allowing engine 2 coupled to first carrier 106 to rotate forward acts on engine 2, and engine 2 can be started (motored or cranked) by first MG 4. In that case, a torque having a direction to stop reduction gear 14 from rotating acts on reduction gear 14. Thus, a drive torque for causing vehicle 40 to run can be maintained by controlling a torque output from second MG 6 and simultaneously engine 2 can be started smoothly. This type of hybrid system is referred to as a mechanical distribution type or a split type.

Reduction planetary gear 200 is a planetary gear provided between reduction gear 14 and second MG 6. Reduction planetary gear 200 changes the rotation speed of second MG 6 for transmission to reduction gear 14. It is noted that reduction planetary gear 200 may be omitted and the output shaft of second MG 6 may be directly coupled to reduction gear 14.

Reduction planetary gear 200 includes a second ring gear 202, a second pinion gear 204, a second carrier 206, and a second sun gear 208. Second sun gear 208 is an externally toothed gear coupled to the output shaft of second MG 6. Second ring gear 202 is an internally toothed gear arranged concentrically with respect to second sun gear 208, and is coupled to reduction gear 14. Second pinion gear 204 meshes with each of second ring gear 202 and second sun gear 208. Second carrier 206 holds second pinion gear 204 rotatably and revolvably, and is fixed so as not to rotate. Second carrier 206 is fixed so as not to rotate by means of a housing of the transmission, for example. A projection provided on second carrier 206, for example, is fitted into a recess formed in the housing of the transmission, so that second carrier 206 is restricted in movement in the direction of rotation.

Reduction planetary gear 200 may change the rotation speed of second MG 6 in one step or several steps for transmission to reduction gear 14 by restricting rotation, synchronizing rotation, or canceling restriction on or synchronization of rotation of each element of the planetary gear by means of a frictional engagement element based on a control signal from HV-ECU 302.

Engine speed sensor 34 is connected to engine ECU 304. Engine speed sensor 34 detects the speed of engine 2, and transmits a signal indicating the detected speed of engine 2 to engine ECU 304.

HV-ECU 302 and engine ECU 304 are connected with communication bus 310 such that they can communicate with each other. Although the present embodiment describes HV-ECU 302 and engine ECU 304 as separate ECUs, they may be an integrated ECU.

In such vehicle 40, engine ECU 304 controls engine 2 such that engine 2 operates along a predetermined operation line.

Figure 2:
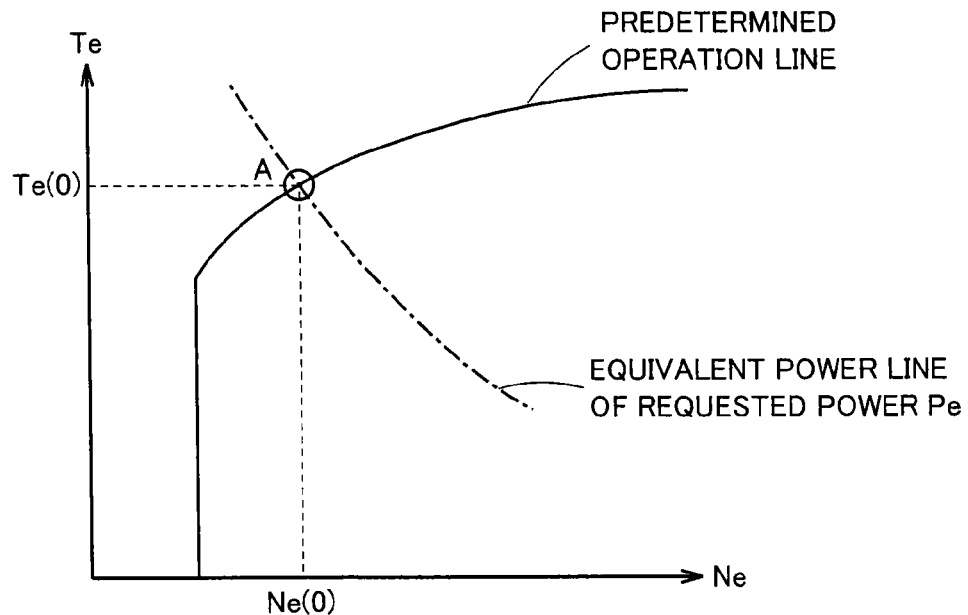
FIG. 2 is a diagram showing a predetermined operation line of an engine.

The predetermined operation line is an operation line indicated by the solid line of FIG. 2, set on a coordinate plane with the vertical axis indicating torque Te of engine 2 and the horizontal axis indicating a rotation speed Ne of engine 2. The predetermined operation line shows the relation between a target value of torque Te (hereinafter referred to as a target torque) of engine 2 and a target value of rotation speed Ne (hereinafter referred to as a target rotation speed) of engine 2, and is set such that better fuel efficiency characteristics are obtained than in the case where engine 2 is operated on another operation line.

Control of engine 2 using the predetermined operation line will now be described. HV-ECU 302 determines requested power Pe of engine 2 based on an amount by which an accelerator pedal is depressed, an amount by which a brake pedal is depressed, a vehicular speed, and the like, for transmission to engine ECU 304. Engine ECU 304 specifies an intersection A between an equivalent power line (alternate long and short dash line of FIG. 2) of requested power Pe of engine 2 received from HV-ECU 302 and the predetermined operation line. Engine ECU 304 determines a torque Te(0) corresponding to intersection A as a target torque, and determines rotation speed Ne(0) corresponding to intersection A as a target rotation speed. Engine ECU 304 controls engine 2 such that a real torque and a real speed of engine 2 attain the target torque and the target rotation speed as determined, respectively.

It is noted that engine ECU 304 may control engine 2 by adjusting at least one of the throttle angle, the amount of fuel injected and the timing of ignition so as to achieve the target torque and the target rotation speed as determined. In addition to or instead of controlling engine 2 by engine ECU 304, output torque Ta of first MG 4 may be controlled via HV-ECU 302 to control engine 2 so as to achieve the target torque and the target rotation speed as determined.

In such vehicle 40, however, when torque command value Tm for second MG 6 is around zero (that is, falls within a predetermined range centered around torque command value Tm=0), abnormal noise may occur such as rattling noise caused by continuous collision of teeth sections in a plurality of gears that couple engine 2, first MG 4 and second MG 6. In the present embodiment, the plurality of gears that couple engine 2, first MG 4 and second MG 6 include reduction gear 14, power split device 100 and reduction planetary gear 200.

In order to prevent occurrence of such rattling noise, it is conceivable to control engine 2 providing separate operation lines for engine 2 for the case where torque command value Tm falls within the predetermined range and for the case where torque command value Tm does not fall within the predetermined range.

Figure 3:
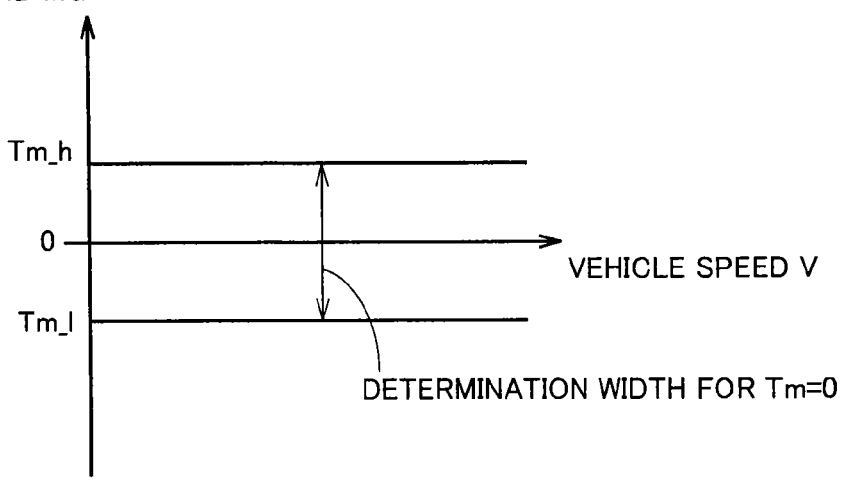
FIG. 3 shows a determination width for determining that torque command value Tm=0 holds.

For example, as shown in FIG. 3, a torque command value Tm_h is set as the upper limit value of a determination width in which it is determined that torque command value Tm for second MG 6=0 holds, and a torque command value Tm_1 is set as the lower limit value. It is noted that the vertical axis of FIG. 3 indicates torque command value Tm for second MG 6, and the horizontal axis of FIG. 3 indicates the vehicular speed. More specifically, irrespective of changes in vehicular speed, HV-ECU 302 determines that torque command value Tm=0 holds when torque command value Tm for second MG 6 is between upper limit value Tm_h and lower limit value Tm_1, and determines that torque command value Tm≠0 holds when torque command value Tm is not between upper limit value Tm_h and lower limit value Tm_1. Upper limit value Tm_h and lower limit value Tm_1 are upper and lower limit values of torque command value Tm set as values at which rattling noise may occur, and adapted by, for example, experiments or the like.

Figure 4:
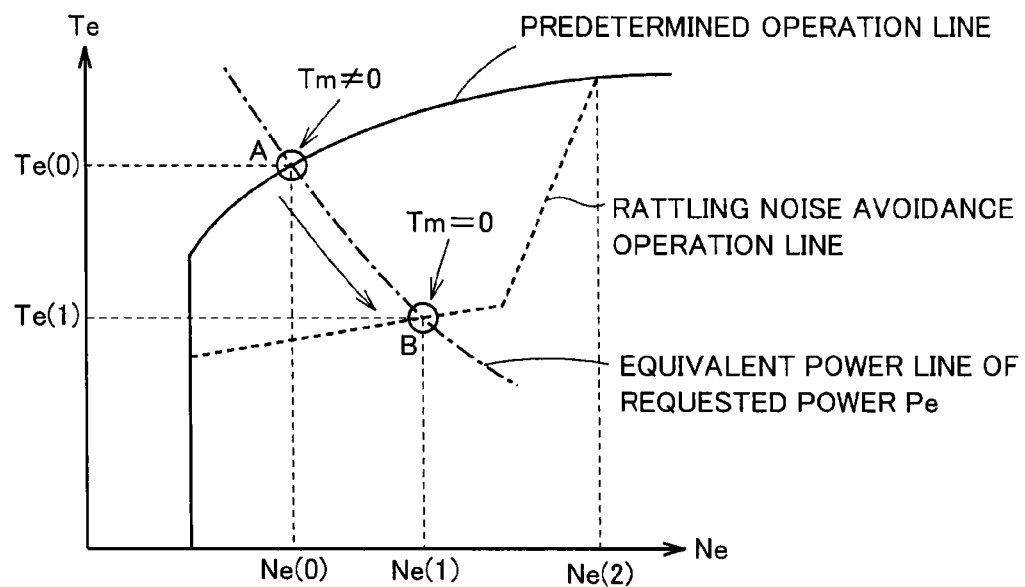
FIG. 4 is a diagram showing a predetermined operation line of the engine and a rattling noise avoidance operation line.

As shown in FIG. 4, when it is determined in HV-ECU 302 that torque command value Tm≠0 holds, engine ECU 304 controls engine 2 such that engine 2 operates along a predetermined operation line indicated by the solid line of FIG. 4. It is noted that the predetermined operation line shown in FIG. 4 is identical to the predetermined operation line shown in FIG. 2, detailed description of which will not be repeated.

On the other hand, when it is determined in HV-ECU 302 that torque command value Tm=0 holds, engine ECU 304 controls engine 2 such that engine 2 operates along a rattling noise avoidance operation line indicated by the long broken line of FIG. 4.

The rattling noise avoidance operation line indicated by the long broken line of FIG. 4 is an operation line set such that occurrence of rattling noise is more likely to be prevented than in the case where engine 2 is operated along the predetermined operation line, and is an operation line set in consideration of fluctuations in every operation of the internal combustion engine and the transmission.

As compared to the predetermined operation line, the rattling noise avoidance operation line is set such that changes in torque of engine 2 are similar to changes in speed of engine 2 in a range where the speed of engine 2 is larger than or equal to Ne(2), and is set such that the torque is smaller with respect to an identical speed in a range where the speed of engine is smaller than Ne(2).

When it is determined that torque command value Tm=0 holds and when requested power Pe is determined, engine ECU 304 specifies an intersection B between an equivalent power line (alternate long and short dash line of FIG. 4) of requested power Pe and the rattling noise avoidance operation line. Engine ECU 304 determines a torque Te(1) corresponding to intersection B as a target torque, and determines a rotation speed Ne(1) corresponding to intersection B as a target rotation speed.

By executing such control, occurrence of rattling noise can be prevented in proximity to torque command value Tm=0. However, since the rattling noise avoidance operation line is set such that occurrence of rattling noise is prevented in consideration of fluctuations in every operation of the internal combustion engine and the transmission, fuel efficiency may be degraded.

Figure 5:
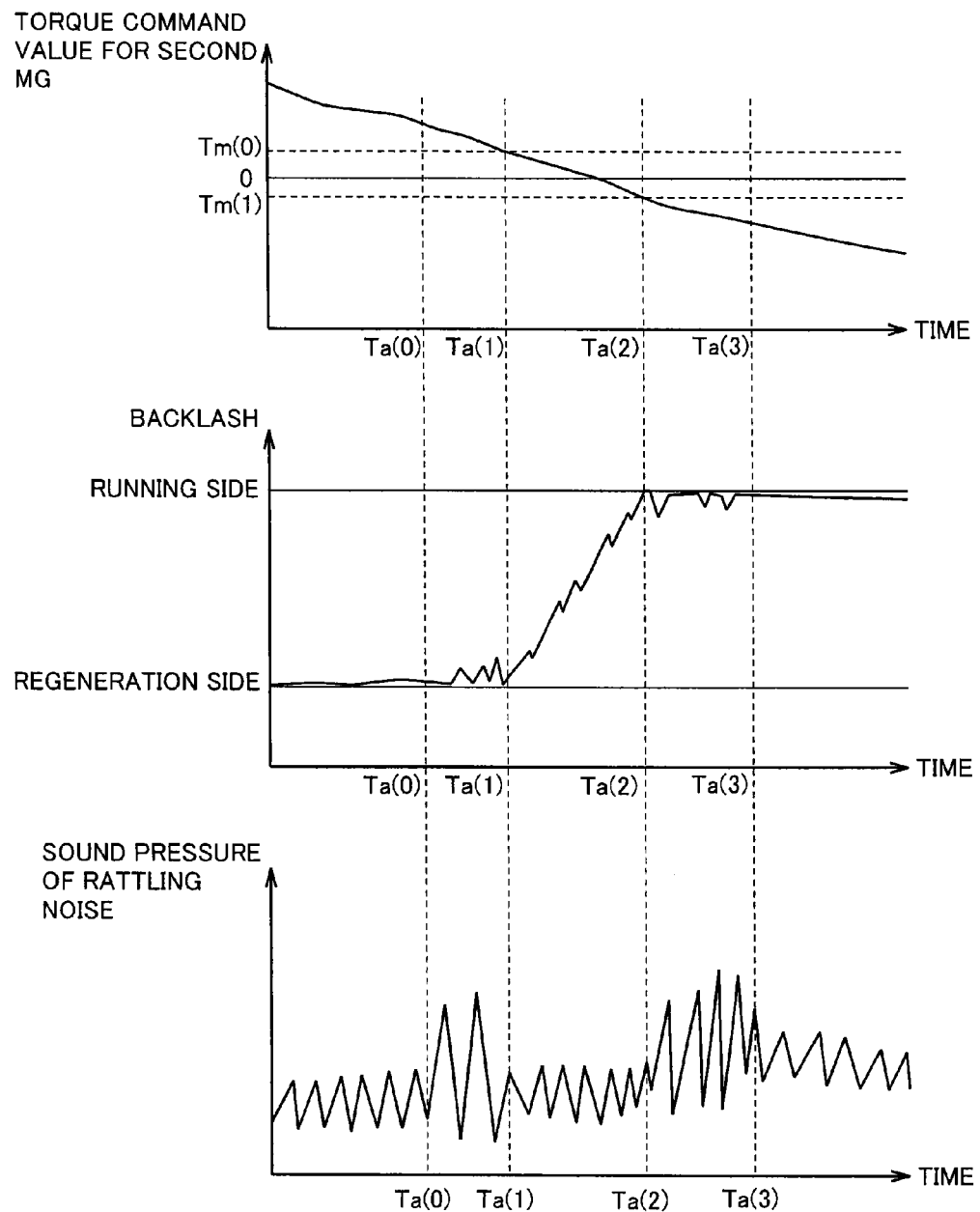
FIG. 5 illustrates timing charts showing changes in backlash and sound pressure of rattling noise relative to changes in torque command value Tm for second MG.

Moreover, in proximity to torque command value Tm=0, the sound pressure of rattling noise shows properties as shown in FIG. 5. FIG. 5 illustrates timing charts showing changes in amount of backlash of a plurality of gears and changes in sound pressure of rattling noise relative to changes in torque command value Tm for second MG 6. As shown in FIG. 5, for example, the case where torque command value Tm for second MG decreases in the direction of reverse rotation from a value in the direction of forward rotation is assumed.

Since torque command value Tm for second MG 6 attains a value in the direction of forward rotation until time Ta(0) arrives, the state where backlash is completely eliminated at the regeneration side by output torque Tb of second MG 6 is brought about. Therefore, the teeth sections of the plurality of gears keep in contact with one another, so that rattling noise that would be caused by collision of the teeth sections does not occur. Since the degree of occurrence of rattling noise is therefore small, the sound pressure of rattling noise is not increased.

At time Ta(0), when torque command value Tm for second MG 6 further decreases to approach zero, the force by which backlash is eliminated at the regeneration side by output torque Tb of second MG 6 is weakened. As a result, a change of state is repeated between the state where backlash is completely eliminated at the regeneration side and the state where backlash is not completely eliminated at the regeneration side from time Ta(0) to Ta(1), so that rattling noise will be produced.

Figure 6:
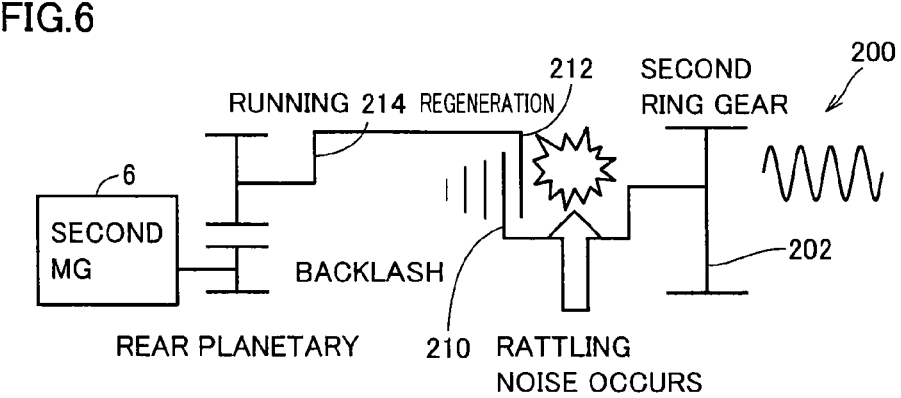
FIG. 6 is a diagram for explaining the state where rattling noise occurs.

The state of backlash in some teeth sections of reduction planetary gear 200 at this time is simply shown in FIG. 6. In the state where backlash is completely eliminated at the regeneration side, as shown in FIG. 6, a teeth section 210 of second ring gear 202 and a teeth section 212 of second pinion gear 204 come into contact to bring about the state where motive power is transmitted between teeth section 210 and teeth section 212. In FIG. 6, "backlash" at the regeneration side refers to a clearance between teeth section 210 and teeth section 212, and "backlash" at the running side refers to a clearance between teeth section 210 and a teeth section 214. In addition, the "amount of backlash" refers to the dimension of clearance.

Since collision between teeth section 210 and teeth section 212 is repeated when a change of state is repeated between the state where backlash is completely eliminated at the regeneration side (i.e., the state where teeth section 210 and teeth section 212 are in contact) and the state where backlash is not completely eliminated (i.e., the state where teeth section 210 and teeth section 212 are spaced), rattling noise will occur.

On the other hand, as shown in FIG. 5, when torque command value Tm for second MG 6 is substantially zero between Tm(0) and Tm(1) from time Ta(1) to time Ta(2), backlash of the plurality of gears is not eliminated at either the regeneration side or the running side, so that the sound pressure of rattling noise becomes smaller than the sound pressure of rattling noise between time Ta(0) and Ta(1).

Figure 7:
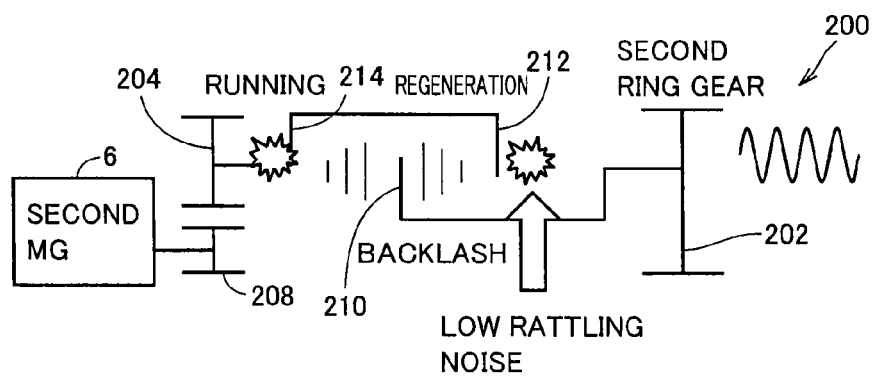
FIG. 7 is a diagram for explaining the state where rattling noise does not occur.

The state of backlash in some teeth sections of reduction planetary gear 200 at this time is simply shown in FIG. 7. When torque command value Tm for second MG 6 is substantially zero, as shown in FIG. 7, teeth section 210 of second ring gear 202 will vibrate due to transfer of vibrations from driving wheel 12 side with respect to a position nearly in the middle between teeth section 212 of second pinion gear 204 and teeth section 214 adjacent to teeth section 212. Therefore, teeth section 210 does not contact teeth section 212 or teeth section 214 even if it vibrates, or even if they contact, contact is made with the moving speed of teeth section 210 reduced, so that the impact force is small. Therefore, the sound pressure of rattling noise becomes smaller than the sound pressure of rattling noise between time Ta(0) and Ta(1).

From time Ta(2) to time Ta(3), when torque command value Tm for second MG 6 increases in the direction of reverse rotation, a change of state is repeated between the state where backlash is completely eliminated at the running side and the state where backlash is not completely eliminated at the running side, so that rattling noise will occur.

After time Ta(3), when torque command value Tm for second MG 6 further increases in the direction of reverse rotation, the force by which backlash is eliminated at the running side by output torque Tb of second MG 6 is strengthened to bring about the state where backlash is completely eliminated at the running side. Since the degree of occurrence of rattling noise is therefore small, the sound pressure of rattling noise is not increased.

As described above, there is a range where the sound pressure of rattling noise is reduced in the vicinity of torque command value Tm for second MG 6=0.

Then, HV-ECU 302 as a vehicle control device according to the present embodiment is characterized by, when a first execution condition including a condition that a requested torque Treq2 requested of second MG 6 enters a first range is met, maintaining torque command value Tm for second MG 6 within a second range included in the first range. The second range is a range including the case where torque command value Tm attains zero, and is a range between Tm(0) and Tm(1) in the present embodiment.

Moreover, in the present embodiment, HV-ECU 302 changes torque command value Tm so as to fall within the second range included in the first range before requested torque Treq2 does, and then maintains the torque command value in the second range.

It is noted that, in the present embodiment, the first range is a range between a first threshold value X at the positive side and a second threshold value Y at the negative side, where rattling noise is produced in a plurality of gears. First threshold value X and second threshold value Y are predetermined values. It is noted that the first range may have its upper limit value larger than first threshold value X and its lower limit value smaller than second threshold value Y.

Moreover, in the present embodiment, the first execution condition further includes a condition that the operating point of engine 2 falls within the operating area of engine 2 where rattling noise occurs.

In the present embodiment, when a second execution condition that the absolute value of the difference between requested torque Treq2 and torque command value Tm is smaller than or equal to a predetermined value is met after torque command value Tm is changed so as to fall within the second range, HV-ECU 302 changes torque command value Tm so as to exceed the first range before requested torque Treq2 does. Although the present embodiment describes the predetermined value as zero, for example, it may be a value other than zero.

Further, in the present embodiment, when the first execution condition is met, HV-ECU 302 determines the torque command value such that the absolute value of the amount of change in torque command value Tm is larger than the absolute value of the amount of change in requested torque.

Figure 8:
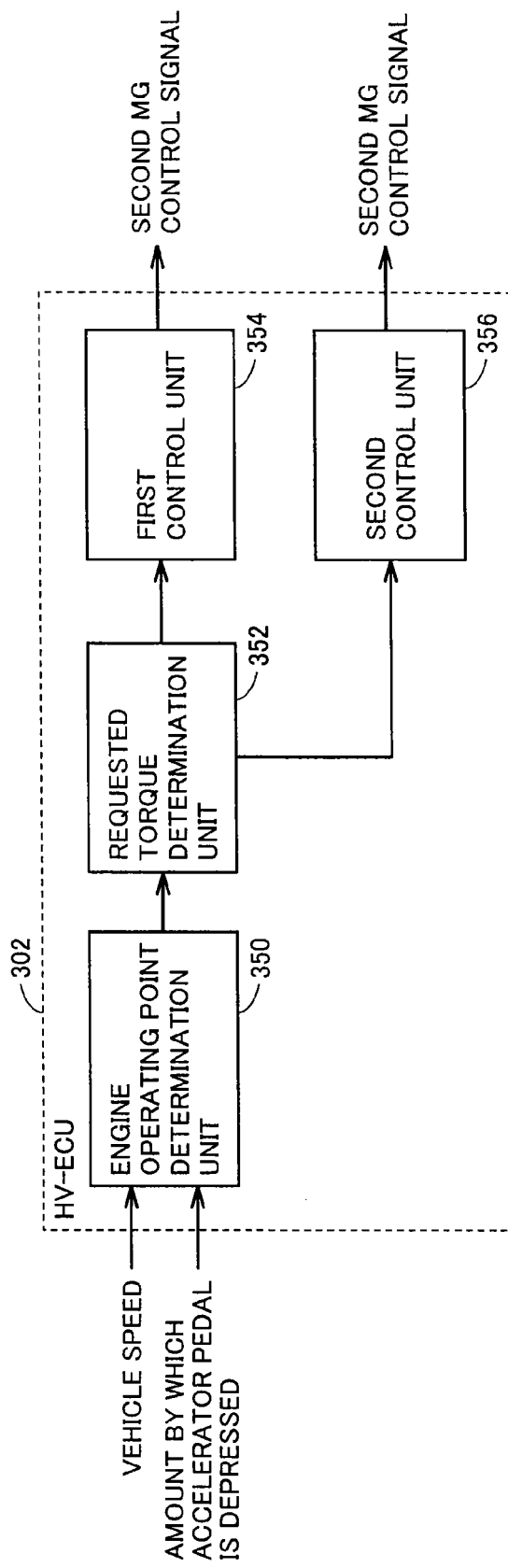
FIG. 8 is a functional block diagram of HV-ECU as a vehicle control device according to the present embodiment.

FIG. 8 is a functional block diagram of HV-ECU 302 as the vehicle control device according to the present embodiment. HV-ECU 302 includes an engine operating point determination unit 350, a requested torque determination unit 352, a first control unit 354, and a second control unit 356.

Engine operating point determination unit 350 determines whether or not the operating point of engine 2 falls within a rattling noise producing range. Specifically, when rotation speed Ne of engine 2 is smaller than or equal to Ne(2) shown in FIG. 4, engine operating point determination unit 350 determines that the operating point of engine 2 falls within the rattling noise producing range. When rotation speed Ne of engine 2 is larger than Ne(2), engine operating point determination unit 350 determines that the operating point of engine 2 does not fall within the rattling noise producing range.

It is noted that engine operating point determination unit 350 may turn on an operating point determination flag, for example, when determined that the operating point of engine 2 falls within the rattling noise producing range.

Requested torque determination unit 352 calculates requested torque Treq2 requested of second MG 6, and determines whether or not requested torque Treq2 calculated falls within the rattling noise producing range.

Specifically, when requested torque Treq2 is smaller than first threshold value X (>0) and larger than second threshold value Y (<0), requested torque determination unit 352 determines that requested torque Treq2 falls within the rattling noise producing range. It is noted that first threshold value X and second threshold value Y may be the same value. First threshold value X corresponds to Tm_h shown in FIG. 3, and second threshold value Y corresponds to Tm_1 shown in FIG. 3.

When requested torque Treq2 is larger than or equal to first threshold value X, or smaller than or equal to second threshold value Y, requested torque determination unit 352 determines that requested torque Treq2 does not fall within the rattling noise producing range.

It is noted that, when determined that requested torque Treq2 falls within the rattling noise producing range, for example, engine operating point determination unit 350 may turn on a torque determination flag.

When it is determined by engine operating point determination unit 350 that the operating point of engine 2 does not fall within the rattling noise producing range or when it is determined by requested torque determination unit 352 that requested torque Treq2 does not fall within the rattling noise producing range, first control unit 354 generates torque command value Tm for achieving requested torque Treq2 to control second MG 6. At this time, torque command value Tm=requested torque Treq2 holds.

It is noted that first control unit 354 may generate torque command value Tm for achieving requested torque Treq2 to control second MG 6 when, for example, the operation determination flag is off or when the torque determination flag is off.

When it is determined by engine operating point determination unit 350 that the operating point of engine 2 falls within the rattling noise producing range and when it is determined by requested torque determination unit 352 that requested torque Treq2 falls within the rattling noise producing range, second control unit 356 changes torque command value Tm such that torque command value Tm for second MG 6 attains zero before requested torque Treq2 does.

Second control unit 356 determines, for example, a product of the amount of time change in requested torque Treq2 (or the difference between requested torque Treq2 in the present calculation cycle and a requested torque Treq2' in the last calculation cycle) and a coefficient larger than 1, as an amount of change ΔTm in torque command value Tm. Second control unit 356 determines torque command value Tm in the present calculation cycle by adding amount of change ΔTm in torque command value Tm (or the product of determined amount of change ΔTm in torque command value Tm and a predetermined calculation cycle time) to a torque command value Tm' in the last calculation cycle.

When torque command value Tm is changed to attain zero, second control unit 356 maintains torque command value Tm at zero. Although the present embodiment describes that second control unit 356 maintains torque command value Tm at zero, it is not particularly limited to zero, and it may be maintained in the second range between Tm(0) and Tm(1), for example.

When the second execution condition that the absolute value of the difference between requested torque Treq2 and torque command value Tm is smaller than or equal to a predetermined value is met after torque command value Tm is changed to zero, second control unit 356 changes torque command value Tm such that torque command value Tm exceeds the rattling noise producing range before requested torque Treq2 does. That is, second control unit 356 changes the torque command value so as to become larger than or equal to first threshold value X or so as to become smaller than or equal to second threshold value Y before requested torque Treq2 does.

When the second execution condition is met, second control unit 356 determines, for example, a product of the amount of time change in requested torque Treq2 (or the difference from requested torque Treq2' in the last calculation cycle) and a coefficient larger than 1, as amount of change ΔTm in torque command value Tm. Second control unit 356 determines torque command value Tm in the present calculation cycle by adding amount of change ΔTm in torque command value Tm to torque command value Tm' in the last calculation cycle.

When torque command value Tm exceeds the rattling noise producing range by changing torque command value Tm after the second execution condition is met, second control unit 356 maintains torque command value Tm at the time when it has exceeded the rattling noise producing range (i.e., first threshold value X or second threshold value Y). When requested torque Treq2 attains first threshold value X so that torque command value Tm having been maintained and requested torque Treq2 match, second control unit 356 determines torque command value Tm such that torque command value Tm=requested torque Treq2 holds. Second control unit 356 generates a second MG control signal based on determined torque command value Tm, and transmits the second MG control signal to inverter 16.

The present embodiment describes that engine operating point determination unit 350, requested torque determination unit 352, first control unit 354, and second control unit 356 function as software, each being implemented by CPU of HV-ECU 302 executing a program stored in a memory, however, they may be implemented by hardware. It is noted that such a program is stored in a storage medium and mounted on a vehicle.

Figure 9:
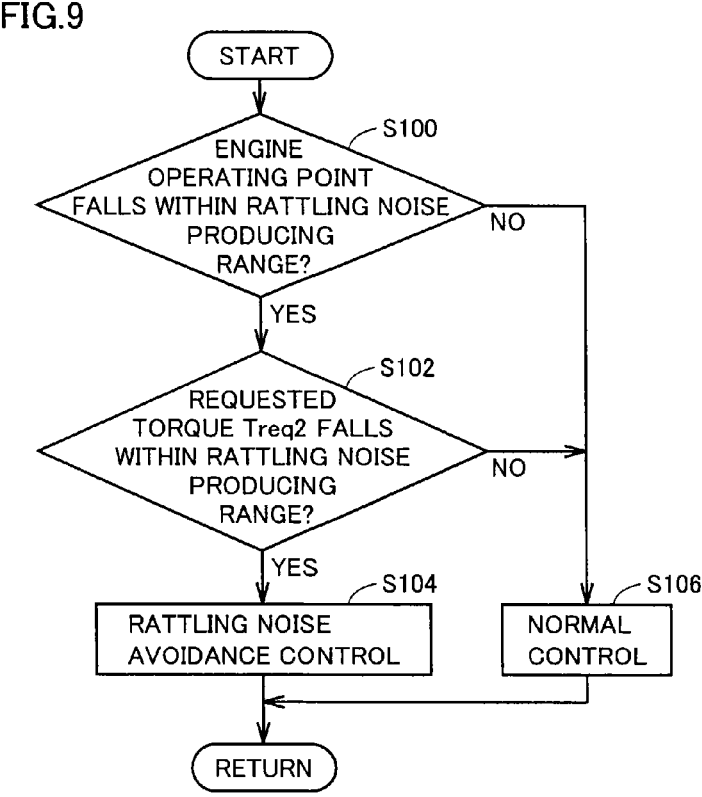
FIG. 9 is a flowchart showing a control structure of a program executed by HV-ECU as the vehicle control device according to the present embodiment.

Referring to FIG. 9, a control structure of the program executed by HV-ECU 302 as the vehicle control device according to the present embodiment will be described.

In step (hereinafter, step will be denoted by S) 100, HV-ECU 302 determines whether or not the operating point of engine 2 falls within the rattling noise producing range. When the operating point of engine 2 falls within the rattling noise producing range (YES in S100), the process proceeds to S102. Otherwise (NO in S100), the process proceeds to S106.

In S102, it is determined whether or not requested torque Treq2 falls within the rattling noise producing range. When requested torque Treq2 falls within the rattling noise producing range (YES in S102), the process proceeds to S104. Otherwise (NO in S102), the process proceeds to S106.

In S104, HV-ECU 302 executes rattling noise avoidance control. The rattling noise avoidance control is identical to control of second MG 6 that the above-mentioned second control unit 356 executes. Therefore, the detailed description thereof will not be repeated.

In S106, HV-ECU 302 executes normal control. That is, HV-ECU 302 determines torque command value Tm such that torque command value Tm=requested torque Treq2 holds, and controls second MG 6 based on determined torque command value Tm.

An operation of HV-ECU 302 as the vehicle control device according to the present embodiment based on the structure and flowchart as described above will be described using FIGS. 10 and 11. The vertical axis of FIG. 10 indicates torque command value Tm, and the horizontal axis of FIG. 10 indicates time. The vertical axis of FIG. 11 indicates torque Te of engine 2, and the horizontal axis of FIG. 11 indicates rotation speed Ne of engine 2.

Figure 10:
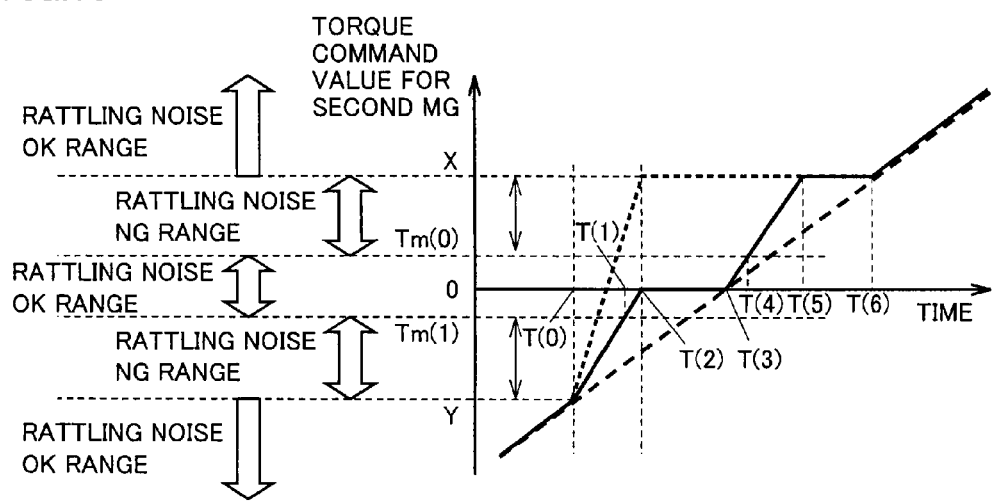
FIG. 10 is a timing chart for explaining operation of HV-ECU as the vehicle control device according to the present embodiment.

As indicated by the long broken line of FIG. 10, the case where requested torque Treq2 changes linearly from the direction of reverse rotation to the direction of forward rotation is assumed.

Before time T(0), when requested torque Treq2 is smaller than or equal to second threshold value Y (NO in S102), normal control is executed (S106). That is, torque command value Tm is determined such that torque command value Tm=requested torque Treq2 holds, and second MG 6 is controlled based on determined torque command value Tm.

Figure 11:
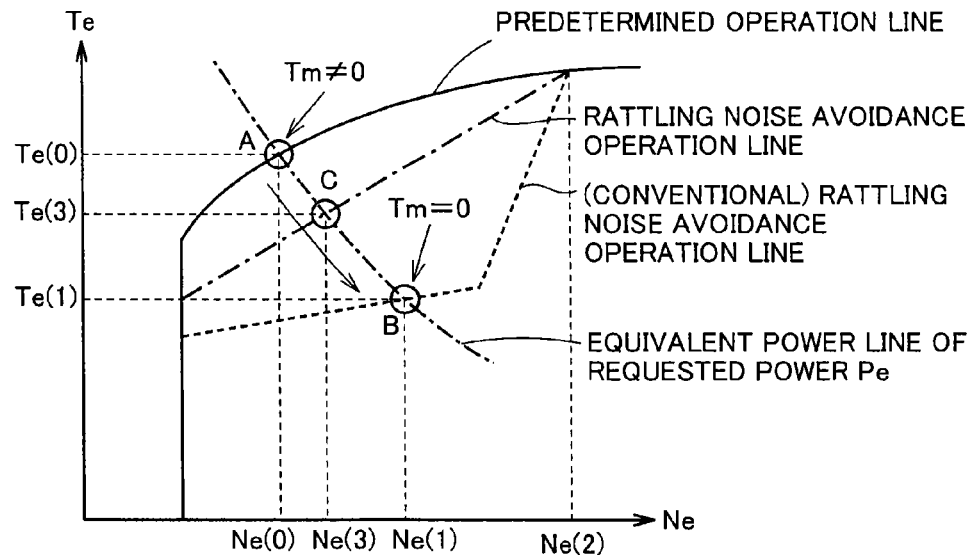
FIG. 11 is a diagram showing a predetermined operation line of the engine and a rattling noise avoidance operation line in the present embodiment.

At this time, a predetermined operation line indicated by the solid line of FIG. 11 is selected as the operation line of engine 2. Engine 2 is controlled by engine ECU 304 such that the operating point (i.e., torque Te and rotation speed Ne of engine 2) moves along the predetermined operation line.

At time T(0), when the operating point of engine 2 falls within the rattling noise producing range (YES in S100) and when requested torque Treq2 becomes larger than second threshold value Y to fall within the rattling noise producing range (YES in S102), the rattling noise avoidance control is executed (S104).

That is, a value obtained by multiplying the amount of time change in requested torque Treq2 by a predetermined coefficient is determined as the amount of change, and torque command value Tm is determined based on the determined amount of change. Therefore, as indicated by the solid line of FIG. 10, torque command value Tm will increase by a larger amount of change than the amount of time change in requested torque Treq2. It is noted that, since requested torque Treq2 increases linearly relative to the time change, torque command value Tm will also increase linearly relative to the time change.

At this time, a conventional rattling noise avoidance operation line indicated by the broken line of FIG. 11 is selected as the operation line of engine 2. Engine 2 is controlled by engine ECU 304 such that the operating point moves along the conventional rattling noise avoidance operation line. Accordingly, the output torque of engine 2 becomes lower relative to identical requested power Pe than in the case where engine 2 is controlled such that the operating point moves along the predetermined operation line, which will reduce the degree of occurrence of rattling noise.

It is noted that the predetermined operation line shown in FIG. 11 is an operation line identical to the predetermined operation line described using FIGS. 2 and 4, and the conventional rattling noise avoidance operation line is identical to the rattling noise avoidance operation line described using FIG. 4. Therefore, the detailed description thereof will not be repeated.

At time T(1), torque command value Tm becomes larger than Tm(1), and thus enters a rattling noise OK range.

At time T(2), when torque command value Tm changes to attain zero, torque command value Tm is maintained at zero until time T(3) when the second execution condition is met arrives, as indicated by the solid line of FIG. 10.

At this time, the rattling noise avoidance operation line indicated by the alternate long and short dash line of FIG. 11 is selected as the operation line of engine 2. Engine 2 is controlled by engine ECU 304 such that the operating point moves along the rattling noise avoidance operation line. Accordingly, engine 2 is controlled at the operating point close to the predetermined operation line offering better fuel efficiency characteristics than the conventional rattling noise avoidance operation line, so that fuel efficiency can be improved.

Moreover, the output torque of engine 2 is higher relative to identical requested power Pe than in the case where engine 2 is controlled such that the operating point moves along the conventional rattling noise avoidance operation line, however, when torque command value Tm enters the rattling noise OK range, the teeth sections in the plurality of gears come into contact with the moving speed reduced so that the impact force is small, as described using FIG. 7. That is, even if collision of the teeth sections is repeated, the sound pressure of rattling noise is reduced.

As indicated by the solid line and long broken line of FIG. 10, when the second execution condition is met at time T(3), torque command value Tm will increase by an amount of change larger than the amount of time change in requested torque Treq2 until torque command value Tm attains first threshold value X. It is noted that, since requested torque Treq2 increases linearly relative to the time change, torque command value Tm will also increase linearly relative to the time change.

At time T(4), torque command value Tm exceeds Tm(0), and thus enters a rattling noise NG range. At this time, the conventional rattling noise avoidance operation line is selected as the operation line of engine 2. Accordingly, the degree of occurrence of rattling noise will be reduced.

At time T(5), when torque command value Tm attains first threshold value X, torque command value Tm is maintained. At time T(5), torque command value Tm for second MG 6 enters the rattling noise OK range. At this time, the predetermined operation line is selected as the operation line of engine 2.

At time T(6), when torque command value Tm and requested torque Treq2 match (NO in S102), then, torque command value Tm is determined such that torque command value Tm=requested torque Treq2 holds (S106).

By thus determining torque command value Tm, when requested torque Treq2 exceeds second threshold value Y as indicated by the short broken line of conventional FIG. 10, the amount of change in torque command value Tm can be made smaller and the difference between torque command value Tm and requested torque Treq2 in a section from time T(0) to time T(5) can be made smaller than in the case of determining the torque command value such that torque command value Tm becomes larger than first threshold value X without maintaining torque command value Tm in the rattling noise OK range.

As described above, with the vehicle control device according to the present embodiment, by maintaining torque command value Tm within the rattling noise OK range including the case where it attains zero, a deviation between torque command value Tm and the requested torque requested of second MG can be reduced while causing the torque command value to pass through the rattling noise NG range more rapidly than in the case where torque command value Tm is not maintained within the rattling noise OK range. This can prevent occurrence of rattling noise that would be caused by repeated collision of the teeth sections, and can prevent sudden changes in torque command value Tm. Therefore, sudden variations in output torque of second MG can be reduced. As a result, variations in electric power (speed×torque) can be reduced, and a gap in power balance resulting from variations in electric power can be reduced. Therefore, a vehicle control device and a vehicle control method which prevent occurrence of abnormal noise can be provided.

Moreover, even when torque command value Tm falls within a range conventionally set as the rattling noise NG range (between first threshold value X and second threshold value Y), an operation line (alternate long and short dash line of FIG. 11) closer to a predetermined operation line (solid line of FIG. 11) than the conventional rattling noise avoidance operation line (broken line of FIG. 11) can be selected for the operating point of engine 2 as shown in FIG. 11, by maintaining torque command value Tm within the rattling noise OK range including Tm=0 as described above. Therefore, with respect to requested power Pe of engine 2, engine 2 can be controlled setting, as a target point, an intersection C which is an operating point offering better fuel efficiency characteristics than intersection B with the conventional rattling noise avoidance operation line, for example. Fuel efficiency can thus be improved.

It is noted that the present embodiment describes that, when the first execution condition that it has been determined that the operating point of engine 2 falls within the rattling noise producing range and when it has been determined that requested torque Treq2 falls within the rattling noise producing range is met, the product of the amount of time change in requested torque Treq2 (or the difference from requested torque Treq2' in the last calculation cycle) and a coefficient larger than 1 is determined as amount of change ΔTm in torque command value Tm, and torque command value Tm is determined based on determined amount of change ΔTm, however, the determination method is not particularly limited as such.

For example, if requested torque Treq2 has a negative value when the first execution condition is met, HV-ECU 302 may determine a value obtained by adding a predetermined value (>0) to requested torque Treq2, as torque command value Tm, and if requested torque Treq2 has a positive value, HV-ECU 302 may determine a value obtained by subtracting a predetermined value (>0) from requested torque Treq2, as torque command value Tm.

Figure 12:
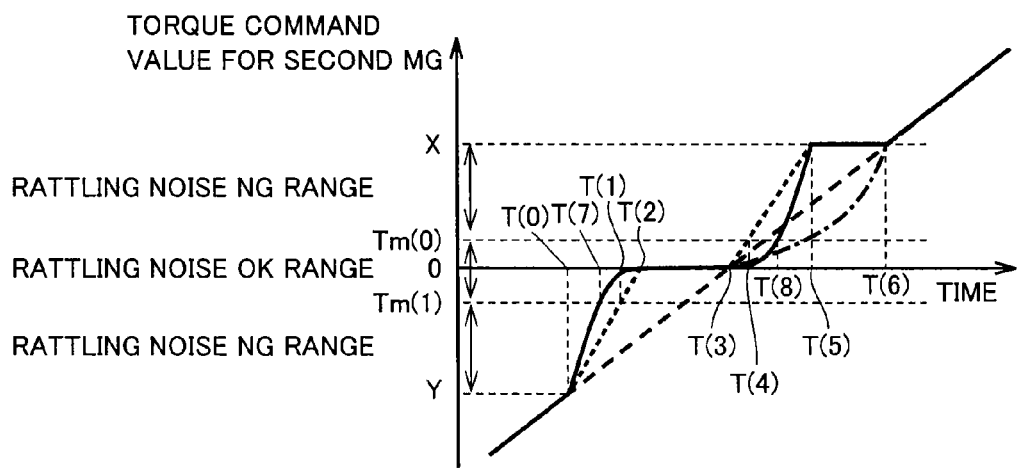
FIG. 12 is a (first) diagram for explaining a method of determining torque command value Tm.

Alternatively, as indicated by the solid line of FIG. 12, HV-ECU 302 may change torque command value Tm such that the locus of changes in torque command value Tm represents a curve projecting in the direction of changing torque command value Tm when the first execution condition is met, and may change the torque command value such that the locus of changes in torque command value Tm represents a curve projecting in the direction opposite to the direction of changing torque command value Tm when the second execution condition is met.

HV-ECU 302, for example, calculates the amount of time change in requested torque Treq2, and calculates an inclination of the straight line indicated by the short broken line of FIG. 12 based on the product of the calculated amount of time change and a coefficient larger than 1. HV-ECU 302 calculates an expected arrival time at which Tm=0 holds based on the calculated inclination of the straight line indicated by the short broken line of FIG. 12. HV-ECU 302 may calculate a function (e.g., quadratic function) that starts from the time of the last calculation cycle and torque command value Tm', that attains Tm=0 after the lapse of the expected arrival time, and that attains an extremal value at the expected arrival time, and may determine present torque command value Tm based on the calculated function and the current time.

Alternatively, when requested torque Treq2 and torque command value Tm match at time T(3), HV-ECU 302 calculates the amount of time change in requested torque Treq2, and calculates an inclination of the straight line indicated by the short broken line of FIG. 12 based on the product of the calculated amount of time change and a coefficient larger than 1. HV-ECU 302 calculates an expected arrival time at which Tm reaches first threshold value X based on the calculated inclination of the straight line indicated by the short broken line of FIG. 12. HV-ECU 302 may calculate a function (e.g., quadratic function) that starts from the time of the last calculation cycle and torque command value Tm', that attains Tm=X after the lapse of the expected arrival time, and that attains an extremal value at the time when requested torque Treq2 and torque command value Tm match, and may determine present torque command value Tm based on the calculated function and the current time.

Then, torque command value Tm will enter the rattling noise OK range at time T(7) earlier than time T(1) at which torque command value Tm would enter the rattling noise OK range from the rattling noise NG range when torque command value Tm is determined using the product of the amount of time change in requested torque Treq2 and a coefficient larger than 1 as amount of change ΔTm (short broken line of FIG. 12), and will enter the rattling noise NG range out of the rattling noise OK range at time T(8) later than time T(4) at which torque command value Tm would enter the rattling noise NG range out of the rattling noise OK range. Therefore, a time period during which torque command value Tm is maintained within the rattling noise OK range can be made longer than in the case of determining torque command value Tm using the product of the amount of time change in requested torque Treq2 and a coefficient larger than 1 as amount of change ΔTm, so that occurrence of rattling noise is more likely to be prevented.

It is noted that changes in torque command value Tm (short broken line of FIG. 12) and changes in requested torque Treq2 (long broken line of FIG. 12) from time T(0) to time T(6) of FIG. 12 are similar to changes in torque command value Tm (solid line of FIG. 10) and changes in requested torque Treq2 (long broken line of FIG. 10) from time T(0) to time T(6) described with reference to FIG. 10, respectively, detailed description of which will thus not be repeated.

HV-ECU 302 may calculate an expected arrival time at which requested torque Treq2 reaches zero, may calculate a function (e.g., quadratic function) that starts from the time of the last calculation cycle and torque command value Tm', that attains Tm=0 after the lapse of the expected arrival time, and that attains an extremal value at the expected arrival time, and may determine present torque command value Tm based on the calculated function and the current time. Alternatively, HV-ECU 302 may change torque command value Tm so as to enter the rattling noise NG range at a time later than in the above-described method, as indicated by the alternate long and short dash line of FIG. 12.

Figure 13:
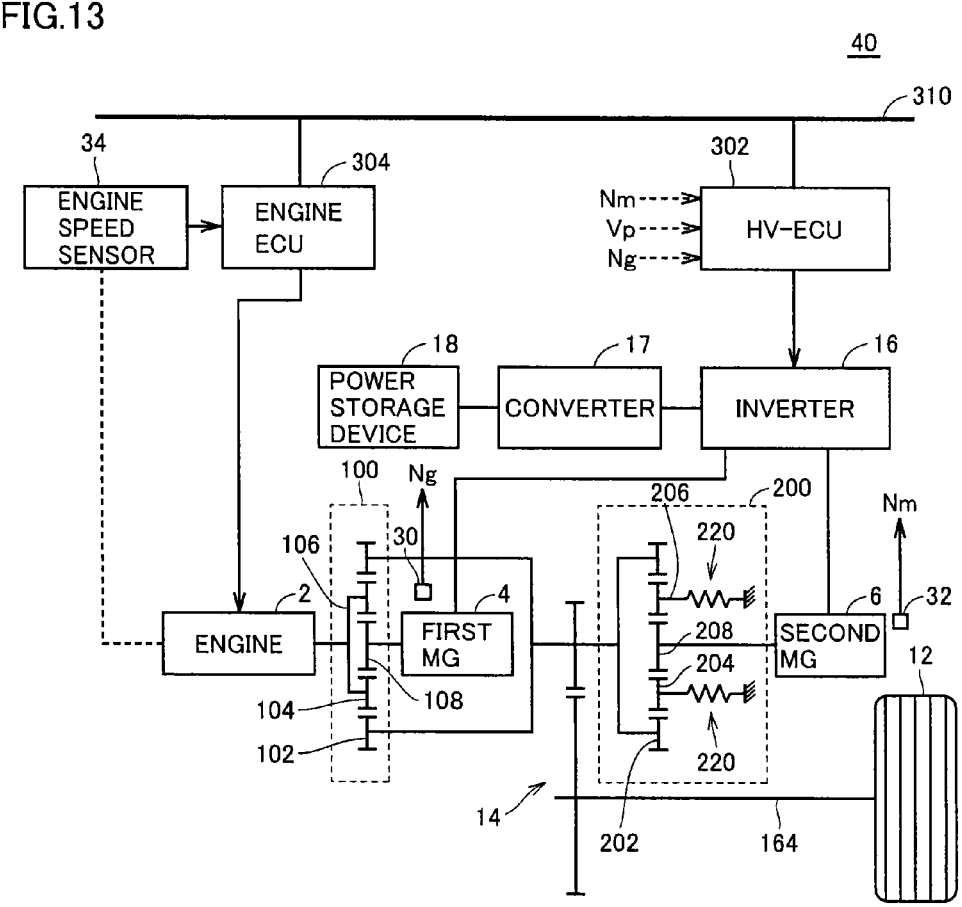
FIG. 13 is a (second) diagram showing an overall configuration of the hybrid vehicle in the present embodiment.

Further, although the present embodiment describes that rotation of second carrier 206 of reduction planetary gear 200 is fixed, second carrier 206 may be fixed with an elastic body 220, such as rubber or spring, interposed therebetween, as shown in FIG. 13. For example, second carrier 206 is fixed with elastic body 220, such as rubber, interposed between a projection of second carrier 206 for restricting rotation and a recess formed in the housing of the transmission.

Figure 14:
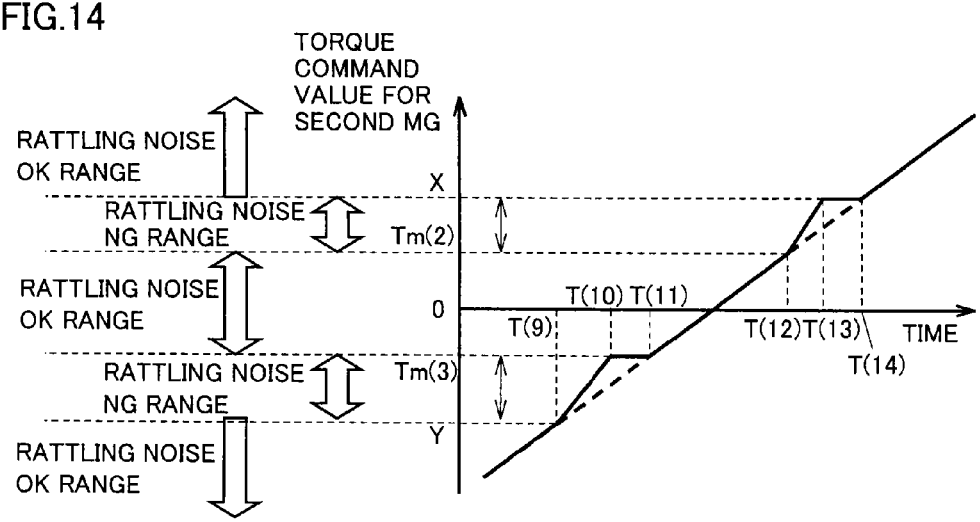
FIG. 14 is a (second) diagram for explaining the method of determining torque command value Tm.

Then, elastic body 220 can absorb the impact force produced by collision of the teeth sections in reduction planetary gear 200. As a result, occurrence of rattling noise can be prevented. By thus providing elastic body 220 between second carrier 206 and the housing of the transmission, the upper limit of the rattling noise OK range can be extended to Tm(2) larger than Tm(0) and the lower limit can be extended to Tm(3) smaller than Tm(1), as shown in FIG. 14. It is noted that, of the features other than elastic body 220 shown in FIG. 13, the same parts as features in FIG. 1 are denoted by the same reference characters. Therefore, detailed description thereof will not be repeated.

When such features are used, as shown in FIG. 14, when requested torque Treq2 falls within the rattling noise NG range at time T(9), for example, HV-ECU 302 changes torque command value Tm so as to enter the rattling noise OK range before requested torque Treq2 does. That is, HV-ECU 302 determines, for example, the product of the amount of time change in requested torque Treq2 (or the difference from requested torque Treq2' in the last calculation cycle) and a coefficient larger than 1 as amount of change ΔTm in torque command value Tm, and adds determined amount of change ΔTm in torque command value Tm (or the product of determined amount of change ΔTm in torque command value Tm and the calculation cycle time) to the last torque command value Tm', thereby determining present torque command value Tm.

At time T(10), when torque command value Tm becomes larger than Tm(3) to enter the rattling noise OK range, HV-ECU 302 maintains torque command value Tm (=Tm(3)) until torque command value Tm and requested torque Treq2 match.

At time T(11), after torque command value Tm and requested torque Treq2 match, torque command value Tm is determined such that torque command value Tm=requested torque Treq2 holds.

At time T(12), when requested torque Treq2 becomes larger than Tm(2) to enter the rattling noise NG range, HV-ECU 302 changes torque command value Tm so as to enter the rattling noise OK range before requested torque Treq2 does. Since the mode of changing torque command value Tm is similar to the mode of changing torque command value Tm from time T(9) to time T(10), detailed description thereof will not be repeated.

At time T(13), when torque command value Tm becomes larger than or equal to first threshold value X to enter the rattling noise OK range, HV-ECU 302 maintains torque command value Tm (=X).

At time T(14), after requested torque Treq2 becomes larger than or equal to first threshold value X so that torque command value Tm having been maintained and requested torque Treq2 match, HV-ECU 302 determines torque command value Tm such that torque command value Tm=requested torque Treq2 holds.

By thus changing torque command value Tm, the time period during which it passes through the rattling noise NG range can be shortened, and the time period during which torque command value Tm and requested torque Treq2 match can be extended. Therefore, driving force in accordance with a request from the vehicle can be generated while preventing occurrence of rattling noise. It is noted that, in this case, the range between Tm(2) and Tm(3) corresponds to the second range.

It should be understood that the embodiment disclosed herein is illustrative and non-restrictive in every respect. The scope of the present invention is defined by the claims not by the description above, and is intended to include any modification within the meaning and scope equivalent to the terms of the claims.

REFERENCE SIGNS LIST

2 engine; 4, 6 MG; 12 driving wheel; 14 reduction gear; 16 inverter; 17 converter; 18 power storage device; 30, 32 rotation speed sensor; 34 engine speed sensor; 40 vehicle; 100 power split device; 102, 202 ring gear; 104, 204 pinion gear; 106, 206 carrier; 108, 208 sun gear; 164 drive shaft; 200 reduction planetary gear; 210, 212, 214 teeth section; 220 elastic body; 302 HV-ECU; 304 engine ECU; 310 communication bus; 350 engine operating point determination unit; 352 requested torque determination unit; 354, 356 control unit

The invention claimed is:

1. A vehicle control device mounted on a vehicle including an internal combustion engine, a first rotating electric machine for generating electric power using motive power of said internal combustion engine, a second rotating electric machine transmitting driving force to a wheel, and a plurality of gears coupling said internal combustion engine, said first rotating electric machine and said second rotating electric machine, comprising:
    a calculation unit for calculating a requested torque requested of said second rotating electric machine based on driving power requested of said vehicle; and
    a control unit for, after a first execution condition including a condition that said requested torque enters a first range is met, maintaining a torque command value for said second rotating electric machine within a second range, said first range being a range between a first threshold value and a second threshold value, and said second range being a range included in said first range and including zero;
    wherein after said first execution condition is met, said control unit determines said torque command value such that an absolute value of an amount of change in said torque command value is larger than an absolute value of an amount of change in said requested torque.

2. The vehicle control device according to claim 1, wherein after said first execution condition is met, said control unit changes said torque command value such that said torque command value falls within said second range before said requested torque does, and then maintains said torque command value within said second range.

3. The vehicle control device according to claim 1, wherein after a second execution condition that an absolute value of a difference between said requested torque and said torque command value is smaller than or equal to a predetermined value is met after said torque command value is changed so as to fall within said second range, said control unit changes said torque command value so as to exceed said first range before said requested torque does.

4. The vehicle control device according to claim 3, wherein after said first execution condition is met, said control unit changes said torque command value such that a locus of changes in said torque command value represents a curve projecting in a direction of changing said torque command value, and after said second execution condition is met, said control unit changes said torque command value such that the locus of changes in said torque command value represents a curve projecting in a direction opposite to the direction of changing said torque command value.

5. The vehicle control device according to claim 1, wherein after said first execution condition is met, said control unit changes said torque command value such that said torque command value attains zero before said requested torque does, and then maintains said torque command value at zero.

6. A vehicle control method for a vehicle including an internal combustion engine, a first rotating electric machine for generating electric power using motive power of said internal combustion engine, a second rotating electric machine transmitting driving force to a wheel, and a plurality of gears coupling said internal combustion engine, said first rotating electric machine and said second rotating electric machine, comprising the steps of:
    calculating a requested torque requested of said second rotating electric machine based on driving power requested of said vehicle;
    after a first execution condition including a condition that said requested torque enters a first range is met, maintaining a torque command value for said second rotating electric machine within a second range,
    said first range being a range between a first threshold value and a second threshold value, and said second range being a range included in said first range and including zero; and
    after said first execution condition is met, determining said torque command value such that an absolute value of an amount of change in said torque command value is larger than an absolute value of an amount of change in said requested torque.

* * * * *